UNITED STATES PATENT OFFICE.

AUGUST VINER, OF CARDIFF, ENGLAND, ASSIGNOR OF ONE-HALF TO CHARLES HJALMAR HUSS, OF SAME PLACE.

COMPOSITION FOR GLAZING COLLARS, CUFFS, &c.

SPECIFICATION forming part of Letters Patent No. 499,685, dated June 13, 1893.

Application filed April 20, 1893. Serial No. 471,215. (No specimens.) Patented in England July 21, 1892, No. 13,328.

*To all whom it may concern:*

Be it known that I, AUGUST VINER, a citizen of the United States, residing at Cardiff, Wales, in the Kingdom of Great Britain, have invented certain new and useful Improvements in Compositions for Glazing Collars, Cuffs, and the Like, (for which I have obtained Letters Patent in Great Britain, dated July 21, 1892, No. 13,328, the said Letters Patent being granted jointly to myself and to Charles Hjalmar Huss;) and I do hereby declare the following to be a full, clear, and exact description of the invention, such as will enable others skilled in the art to which it appertains to make and use the same.

This invention consists in a composition for glazing linen collars, cuffs, shirt-fronts and the like. By its use the linen is glazed without the employment of rollers or polishing irons, and consequently with reduced labor.

The glazing composition which constitutes this invention consists of a mixture or compound of saltpeter, borax, glycerine and water. The saltpeter and borax are dissolved together in the water, and the glycerine is subsequently added. A mixture or compound of one grain of saltpeter, one and one-half grains of borax, dissolved together in eight ounces of water and having one ounce of pure glycerine subsequently added to the solution gives a glazing composition yielding good results in practice. These relative proportions, or approximately these are followed in larger and smaller volumes of the composition.

The composition is applied to the linen after the latter has been washed and ironed in the usual way. The composition is applied by sprinkling, or by a cloth which has been dipped in the composition, or by a sponge or other suitable medium. The composition is applied to the article to be glazed until the latter is damp therefrom. The linen is then again ironed and the effect is to convert the composition into a stiff glaze which imparts a bright, clean finish to the articles treated.

What I claim is—

A composition for glazing linen collars, and other similar articles, consisting of saltpeter, borax, glycerine, and water, substantially as herein set forth.

In testimony whereof I affix my signature in presence of two witnesses.

AUGUST VINER.

Witnesses:
JOHN C. WILSON,
LOUIS P. KELLER.